US009518889B2

(12) United States Patent
Masuda et al.

(10) Patent No.: US 9,518,889 B2
(45) Date of Patent: Dec. 13, 2016

(54) WATER LEAKAGE DETECTION DEVICE

(71) Applicant: MINEBEA CO., LTD., Kitasaku-gun, Nagano (JP)

(72) Inventors: Shigemi Masuda, Fukuroi (JP); Toshikazu Koshiba, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/340,902

(22) Filed: Jul. 25, 2014

(65) Prior Publication Data

US 2015/0059887 A1    Mar. 5, 2015

(30) Foreign Application Priority Data

Aug. 27, 2013  (JP) ................................. 2013-175879

(51) Int. Cl.
*G01M 3/18* (2006.01)
*F17D 5/06* (2006.01)

(52) U.S. Cl.
CPC .................. *G01M 3/18* (2013.01); *F17D 5/06* (2013.01); *Y10T 137/8158* (2015.04)

(58) Field of Classification Search
CPC ........ G01M 3/18; F17D 5/06; Y10T 137/8158
USPC ......................................... 340/605; 137/551
See application file for complete search history.

(56) References Cited

U.S. PATENT DOCUMENTS

| 4,706,153 | A | * | 11/1987 | Sainomoto et al. | ............ | 361/42 |
| 6,035,699 | A | * | 3/2000 | Parlante | ............................ | 73/40 |
| 2006/0196264 | A1 | * | 9/2006 | Stahlmann | .................. | 73/304 R |
| 2010/0073012 | A1 | * | 3/2010 | Inoue et al. | .................. | 324/551 |
| 2013/0055768 | A1 | * | 3/2013 | Takahashi et al. | ........... | 68/13 R |

FOREIGN PATENT DOCUMENTS

JP        2004-317454 A        11/2004

\* cited by examiner

*Primary Examiner* — Jennifer Mehmood
*Assistant Examiner* — Omar Casillashernandez
(74) *Attorney, Agent, or Firm* — Carrier Blackman & Associates, P.C.; William D. Blackman; Jingli Wang

(57) ABSTRACT

There is provided a water leakage detection device including a water leakage detection unit which is configured to detect water leakage, a water leakage detection circuit unit which is configured to be driven by a DC voltage from a DC power source and apply an AC voltage for detecting water leakage to the water leakage detection unit, and is configured to determine whether water is leaking based on a detection signal of the water leakage detection unit. The water leakage detection unit includes an insulating transformer having a primary side and a secondary side, the second side being connected to the water leakage detection unit, and a water leakage detection determining unit which is connected to the primary side of the insulating transformer.

6 Claims, 5 Drawing Sheets

CROSS-SECTIONAL VIEW OF REGULAR WINDING TRANSFORMER

CROSS-SECTIONAL VIEW OF SANDWICH WINDING TRANSFORMER

CONFIGURATION OF TOROIDAL TYPE TRANSFORMER

FRONT VIEW AND SIDE VIEW OF SECTION WINDING TRANSFORMER

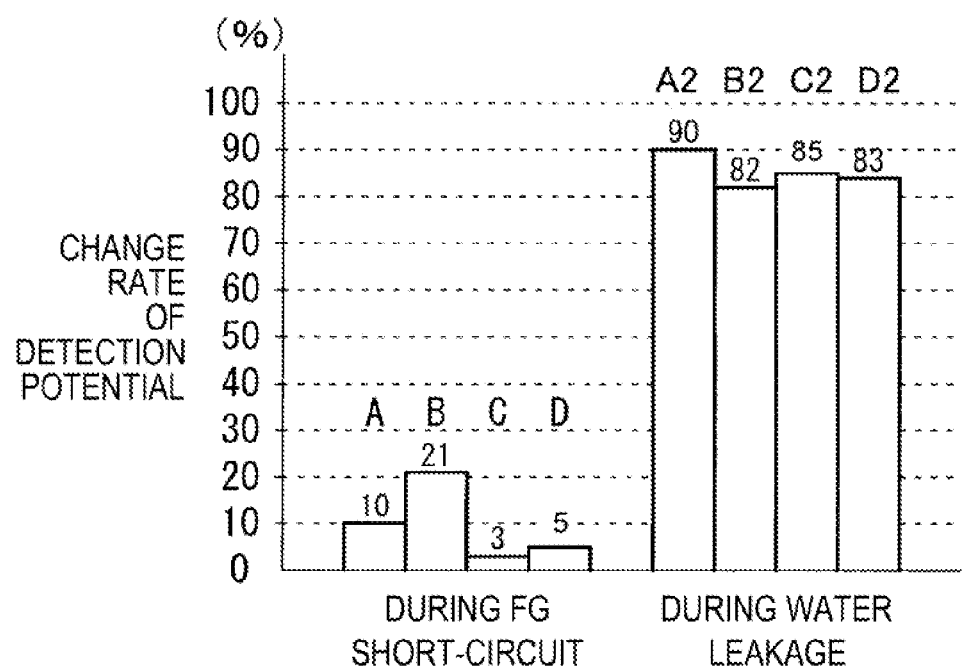

WATER LEAKAGE DETECTION DEVICE

BACKGROUND OF THE INVENTION

1. Field of the Invention

The present invention relates to a water leakage detection device.

2. Description of the Related Art

There has been known a water leakage detection device or a water leakage sensing device which detects water leakage from piping or plumbing in an equipment or an apparatus.

For example, JP-A-2004-317454 discloses in the abstract section that a water leakage detection circuit A includes: a signal generation circuit 24 which outputs a drive signal; a bridge circuit 22 which includes a plurality of transistors, to which electric power from a DC power source 21 is supplied, and which receives the drive signal from the signal generation circuit 24; a water leakage sensor section 26 which includes a detection conductor which always has a voltage with constant positive and negative peak values according to an output of the bridge circuit 22 based on the drive signal from the signal generation circuit 24, and outputs a constant current to the bridge circuit 22, when there is no water leakage; and a voltage-level determination circuit 33 which determines water leakage based on a change in an output voltage of the bridge circuit 22 caused by a change in an output current from the water leakage sensor section 26 due to splashing of liquid onto the water leakage sensor section 26. Further, JP-A-2004-317454 explains, as an effect, that since the water leakage detection circuit is configured by a digital circuit, a transformer is not necessary contrary to a related-art water leakage detection circuit which is configured by an analog circuit, and thus it is possible to simplify and lighten the water leakage detection circuit.

SUMMARY

That is, the above-described water leakage detection circuit includes a digital circuit, and a switching circuit has a full bridge configuration, which would increase cost. Further, a water leakage sensor and the water leakage detection circuit for detecting a signal of the water leakage sensor are not insulated from each other in direct-current manner, which is not preferable in terms of safety during water leakage.

Further, the above-described water leakage detection circuit detects water leakage by a direct current. However, in a direct-current detection method of detecting water leakage by a direct current, there is a fear that the sensor section may corrode. In an alternate-current detection method of detecting water leakage by an alternate current, there is no fear that the sensor portion may corrode; however, as compared to the above-described direct-current detection method, detection sensitivity is largely lower, and thus there is the possibility of erroneous detection.

Accordingly, an object of the present invention is to provide a safe water leakage detection device having a low-cost circuit configuration.

According to an illustrative embodiment of the present invention, there is provided a water leakage detection device comprising: a water leakage detection unit which is configured to detect water leakage; and a water leakage detection circuit unit which is configured to be driven by a DC voltage from a DC power source and apply an AC voltage for detecting water leakage to the water leakage detection unit, and is configured to determine whether water is leaking based on a detection signal of the water leakage detection unit. The water leakage detection unit includes: an insulating transformer having a primary side and a secondary side, the second side being connected to the water leakage detection unit; and a water leakage detection determining unit which is connected to the primary side of the insulating transformer.

The other configurations will be described in the description below.

According to the above configuration, it is possible to provide a water leakage detection device which is safe and has a low-cost circuit configuration.

BRIEF DESCRIPTION OF THE DRAWINGS

In the accompanying drawings:

FIG. 5 is a graph showing the relation between various transformers and detection potentials based on experimental results.

DETAILED DESCRIPTION

Hereinafter, an illustrative embodiment of the present invention will described in detail with reference to the accompanying drawings.

Configuration of First Illustrative Embodiment

Figure 1:
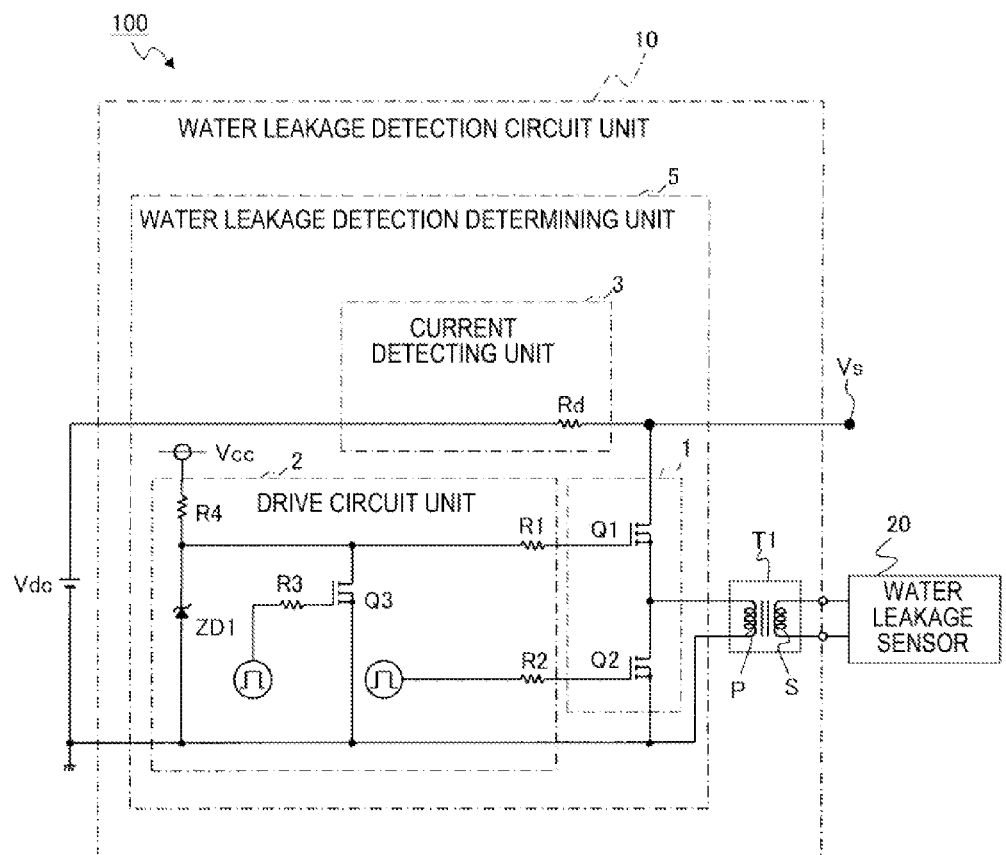
FIG. 1 is a block diagram showing a configuration of a water leakage detection device according to an illustrative embodiment.

FIG. 1 is a block diagram showing a configuration of a water leakage detection device 100 according to the present illustrative embodiment.

As shown in FIG. 1, the water leakage detection device 100 includes a water leakage sensor 20 (an example of a water leakage detection unit) and a water leakage detection circuit unit 10.

The water leakage sensor 20 is a sensor for detecting water leakage and includes two conductors which are spaced apart from each other. The water leakage sensor 20 is connected to the water leakage detection circuit unit 10, and an AC voltage is applied to the water leakage sensor 20 by the water leakage detection circuit unit 10. The two conductors are configured such that an AC current flows by water leakage. When water is not leaking, in the water leakage sensor 20, the two conductors are spaced apart from each other with low-dielectric air interposed therebetween. The impedance of the water leakage sensor 20 is high, and the amount of an AC current flowing in the water leakage sensor 20 is small. If water is leaking, in the water leakage sensor 20, the two conductors are spaced apart from each other with water interposed therebetween. The permittivity of water is higher than the permittivity of air. Therefore, the impedance of the water leakage sensor 20 decreases, and the AC current flowing in the water leakage sensor 20 increases. The AC current flowing in the water leakage sensor 20 is a detection signal of the secondary side of an insulating transformer T1 (described below).

The water leakage detection circuit unit 10 includes the insulating transformer T1 and a water leakage detection determining unit 5. The water leakage detection circuit unit 10 detects water leakage by the water leakage sensor 20, and outputs a water leakage signal Vs to the outside. The water leakage signal Vs is, for example, a voltage between a terminal at the right side of a current detection resistive element Rd (an example of a current detecting unit) in FIG. 1 and a ground. Here, the ground is, for example, a node to which the source of a switching element Q2 is connected.

The insulating transformer T1 is a high-frequency transformer, and is driven at a high frequency of for example, several kHz to several hundreds kHz. The secondary winding S of the insulating transformer T1 is connected to the water leakage sensor 20. The primary winding P of the insulating transformer T1 is connected to the water leakage detection determining unit 5.

The water leakage detection determining unit 5 includes a switching circuit 1, a drive circuit unit 2 for outputting a drive signal to the switching circuit 1, and a current detecting unit 3.

The switching circuit 1 is a half bridge circuit configured by a series circuit of switching elements Q1 and Q2 (connected in series). The switching elements Q1 and Q2 are field effect transistors (FETs). The water leakage detection circuit unit actively supplies the AC voltage to the water leakage detection unit through an insulating transformer. Specifically, the switching circuit 1 applies an AC voltage to the primary winding P of the insulating transformer T1, thereby generating an AC voltage in the secondary winding S of the insulating transformer T1 to be applied to the water leakage sensor 20. The drain of the switching element Q1 is connected to the positive side of a power source Vdc through the current detection resistive element Rd. The source of the switching element Q1 is connected to the drain of the switching element Q2 and one end of the primary winding P of the insulating transformer T1. The source of the switching element Q2 and the other end of the primary winding P of the insulating transformer T1 are connected to the ground.

One end of the resistive element R3 is connected to an external circuit (not shown) and receives a first pulse signal. The other end of the resistive element R3 is connected to the gate of the switching element Q3 and drives the switching element Q3 by the first pulse signal. The drain of the switching element Q3 is pulled up to a power source Vcc through the resistive element R4 and is also connected to the Zener diode ZD1. Therefore, in the drain of the switching element Q3, an inverted signal of the first pulse signal is generated. Further, since the drain of the switching element Q3 is connected to the gate of the switching element Q1 through the resistive element R1, it is possible to drive the switching element Q1 by the inverted signal of the first pulse signal. Incidentally, in a case where a change in the signal to be applied to the gate of the switching element Q1 does not matter, it is possible to replace the Zener diode ZD1 with a resistive element.

One end of the resistive element R2 is connected to the external circuit (not shown) and receives a second pulse signal. The other end of the resistive element R2 is connected to the gate of the switching element Q2. Therefore, it is possible to drive the switching element Q2 by the second pulse signal. The first pulse signal has a square wave form with a duty ratio of, for example, 55%. The second pulse signal has a square wave form having the same frequency as that of the first pulse signal and having a duty ratio of, for example, 45%. The H-level sections of the second pulse signal are included in the H-level sections of the first pulse signal. Therefore, it is possible to prevent the switching element Q1 and the switching element Q2 from being turned on at the same time, resulting in short circuit.

The current detecting unit 3 includes the current detection resistive element Rd. The current detecting unit 3 is configured to detect a DC voltage varying based on the AC current (an example of a detection signal) flowing in the water leakage sensor 20. If the switching circuit 1 applies an AC current to the primary winding P of the insulating transformer T1, a DC current according to the AC current flows in the current detection resistive element Rd. The AC current flowing in the primary winding P of the insulating transformer T1 is proportional to an AC current flowing in the secondary winding S and varies according to whether the water leakage sensor 20 is detecting water leakage. When the water leakage sensor 20 detects water leakage, the AC current (an example of the detection signal) flowing in the secondary winding S of the insulating transformer T1 increases, and the AC current flowing in the primary winding P also increases. Therefore, the current flowing in the current detection resistive element Rd also increases, and a detection potential based on the water leakage signal Vs decreases. Therefore, the water leakage detection circuit unit 10 can detect water leakage.

Since the water leakage detection device 100 uses an AC detection method, a DC current does not flow in the water leakage sensor 20. Therefore, it is possible to prevent corrosion of the water leakage sensor 20, and it is possible to ensure the safety of an operator.

The water leakage detection device 100 has detection sensitivity lower than that in DC detection method. For example, in the water leakage detection device 100, when the secondary side of the insulating transformer T1 is grounded, the water leakage sensor 20 may erroneously detect that water is leaking. A solution to this problem will be described with reference to FIGS. 2 to 5.

Figure 2:
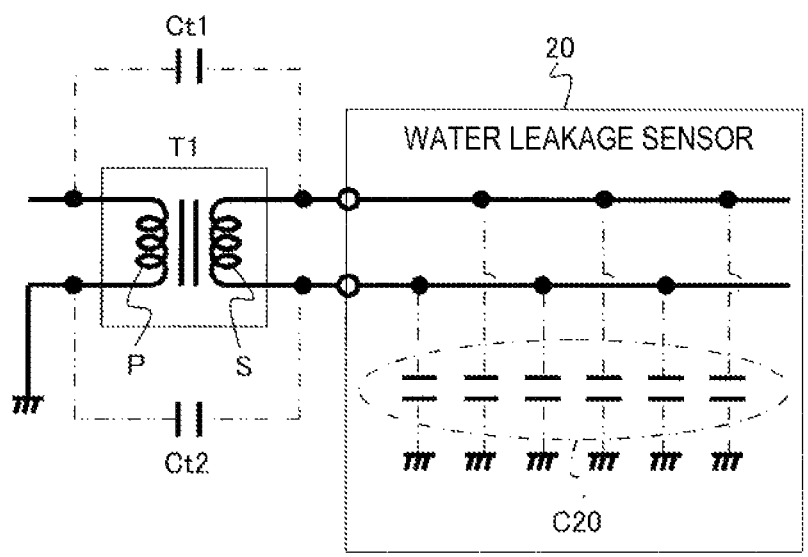
FIG. 2 is an explanatory view of erroneous detection due to parasitic capacitance which is generated in an insulating transformer.

FIG. 2 is an explanatory view of erroneous detection due to parasitic capacitance which is generated in the insulating transformer T1. Parasitic capacitance is a capacitance component which is generated in an electronic component or an electronic circuit without the intention of a designer.

Between the two conductors of the water leakage sensor 20 and the earth of a chassis which is the case (not shown) of the water leakage detection device 100, parasitic capacitance C20 is generated. Further, in the insulating transformer T1, between one end of the primary winding P and one end of the secondary winding S, parasitic capacitance Ct1 is generated. Also, in the insulating transformer T1, between the other end of the primary winding P and the other end of the secondary winding S, parasitic capacitance Ct2 is generated. Therefore, a leakage current flows through the earth of the chassis and the parasitic capacitance C20.

As the values of the parasitic capacitances Ct1 and Ct2 increase, the leakage current increases. Therefore, even when water is not leaking, due to the leakage current, the water leakage detection device 100 is more likely to detect water leakage. The parasitic capacitances Ct1 and Ct2 vary according to the structure of the transformer. In the present illustrative embodiment, a transformer having low parasitic capacitances Ct1 and Ct2 is selected as the insulating transformer T1. Therefore, erroneous detection due to the parasitic capacitances Ct1 and Ct2 can be avoided.

(Relation between Configuration of Transformer and Erroneous Detection)

Figure 3A:
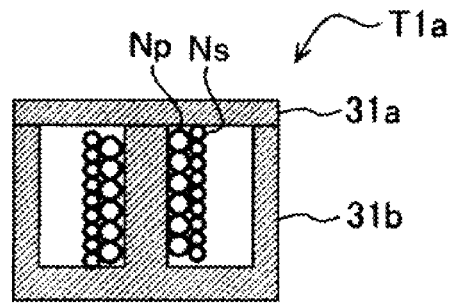
FIGS. 3A to 3C are views schematically showing configurations of various transformers, respectively.
Figure 3B:
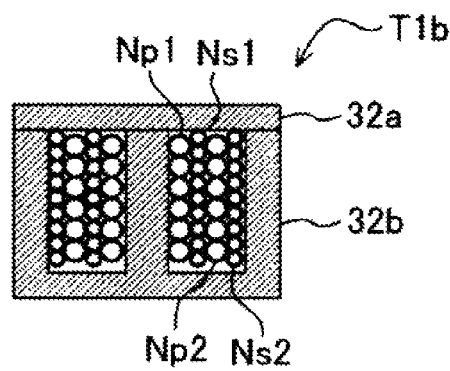
Figure 3C:
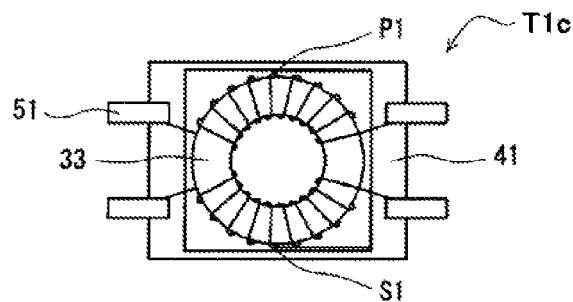

FIGS. 3A to 3C are views schematically showing configurations of various transformers, respectively.

FIG. 3A is a cross-sectional view showing a regular winding transformer T1a.

The regular winding transformer T1a is includes a core 31b having three legs, and a core 31a contacting the three legs. Around the outer periphery of the middle leg of the core 31b, a primary winding Np is wound in a radial direction, and a secondary winding Ns is wounded so as to be in alignment with the outer side of the primary winding Np in the radial direction. The primary winding Np and the secondary winding Ns are wound close to each other, and thus the strength of the magnetic coupling between them is comparatively high. Therefore, the regular winding transformer T1a has high parasitic capacitances Ct1 and Ct2.

FIG. 3B is a cross-sectional view showing a sandwich winding transformer T1b.

The sandwich winding transformer T1b includes a core 32b having three legs, and a core 32a contacting the three legs. Around the outer periphery of the middle leg of the core 32b, a primary winding Np1, a secondary winding Ns1, a primary winding Np2, and a secondary winding Ns2 are wounded so as to be in alignment in a radial direction and form a sandwich structure.

The primary windings Np1 and Np2 and the secondary windings Ns1 and Ns2 are wound close to each other, and the strength of the magnetic coupling between them is higher than that of the regular winding transformer T1a. Therefore, the sandwich winding transformer T1b has high parasitic capacitances Ct1 and Ct2.

FIG. 3C is a plan view showing a configuration of a toroidal type transformer T1c.

The toroidal type transformer T1c includes a core 33 having a torus shape, a bobbin 41 on which the core 33 is mounted, and four lead pins 51 which are provided at both ends of the bobbin 41. Around the core 33 having the torus shape, a primary winding P1 and a secondary winding S1 are wound while being spaced apart from each other. Both ends of the primary winding P1 are electrically connected to two of the lead pins 51, respectively. Both ends of the secondary winding S1 are electrically connected to the other lead pins 51, respectively.

Figure 4A:
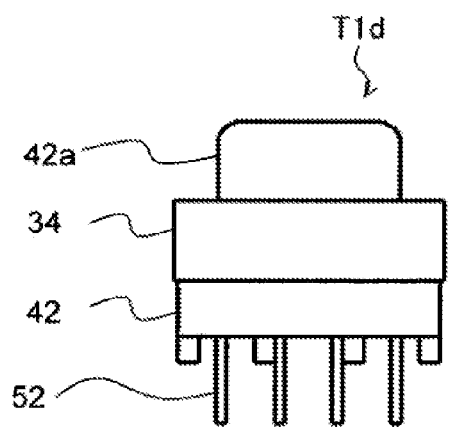
FIGS. 4A and 4B are a front view and a side view showing a section winding transformer, respectively.
Figure 4B:
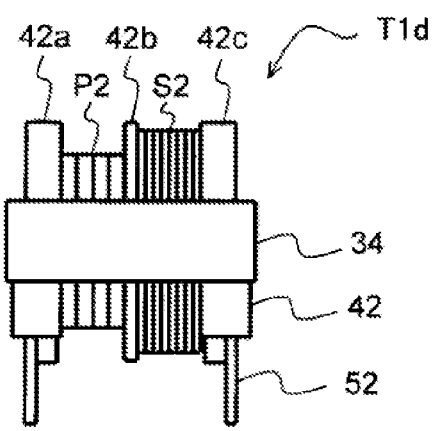

FIGS. 4A and 4B are a front view and a side view showing a section winding transformer T1d, respectively.

FIG. 4A is a front view of the section winding transformer T1d.

In the section winding transformer T1d, a core 34 is mounted on a bobbin 42, and, a flange portion 42a projects out on the upper side of the core 34. Four lead pins 52 are provided below the bobbin 42.

FIG. 4B is a side view of the section winding transformer T1d.

On the upper side of the core 34, sequentially from the left side of FIG. 4B, the flange portion 42a, a flange portion 42b, and a flange portion 42c protrude. Between the flange portions 42a and 42b (a section), a primary winding P2 is wound. Between the flange portions 42b and 42c (a section), a secondary winding S2 is wound.

On the inner side of the primary winding P2 and the secondary winding S2, a middle leg of the core 34 exists. Around the middle leg of the core 34, the primary winding P2 and the secondary winding S2 are wound while being spaced apart from each other.

FIG. 5 is a graph showing the relation between the various transformers shown in FIGS. 3A to 4B and change rates of detection potentials based on experimental results. FIG. 5 shows change rates of detection potentials during frame ground (FG) short-circuit and during water leakage. Herein, 0% represents a case where there is no change from a reference potential. The term "during FG short-circuit" means a case where any one of the two conductors of the water leakage sensor 20 is short-circuited to the frame ground (FG) of the water leakage detection device 100.

The bar graphs A and A2 show change rates of detection potentials for the regular winding transformer T1a. The bar graphs B and B2 show change rates of detection potentials for the sandwich winding transformer T1b. The bar graphs C and C2 show change rates of detection potentials for the toroidal type transformer T1c. The bar graphs D and D2 show change rates of detection potentials for the section winding transformer T1d. The bar graphs A to D show the change rates of the detection potentials during FG short-circuit. The bar graphs A2 to D2 show the change rates of the detection potentials during water leakage.

During FG short-circuit, in the regular winding transformer T1a and the sandwich winding transformer T1b, parasitic capacitances Ct1 and Ct2 are high. For this reason, as shown by the bar graphs A and B, the change rates of the detection potentials are large. Therefore, if those are used as the insulating transformer T1 of the water leakage detection device 100, erroneous detection of water leakage may be caused. In contrast, in the toroidal type transformer T1c and the section winding transformer T1d, the strength of the magnetic coupling between the primary winding P1, P2 and the secondary winding S1, S2 is low and the parasitic capacitances Ct1 and Ct2 are low. Therefore, as shown by the bar graphs C and D, the change rates of the detection potentials are small.

During water leakage, as shown by the bar graphs A2 to D2, the change rates of the detection potentials according to the transformers having different structures do not differ significantly from one another. Therefore, if the toroidal type transformer T1c or the section winding transformer T1d are used as the insulating transformer T1 of the water leakage detection device 100, it is possible to reduce the parasitic capacitances Ct1 and Ct2 and suppress erroneous detection during FG short-circuit.

(Effects)

The water leakage detection device 100 according to this illustrative embodiment has the following effects.

(A) In the water leakage detection device 100, the water leakage sensor 20 and a circuit element group of the water leakage detection determining unit 5 for determining water leakage are spaced apart from each other with the insulating transformer T1 interposed therebetween and are insulated from each other such that a direct current does not flow. When the water leakage sensor 20 detects water leakage, since the circuit element group of the water leakage detection determining unit 5 does not get wet, a breakdown, an electrical short, and the like do not occur. Further, since a DC current does not flow from the water leakage detection determining unit 5 to the water leakage sensor 20, it is possible to safely detect water leakage.

(B) In the water leakage detection device 100, since the insulating transformer T1 is driven at a high frequency, it is possible to use a small transformer as the insulating transformer T1. However, it should be noted that as the drive frequency increases, the parasitic capacitances Ct1 and Ct2 of the insulating transformer T1 increases, the leakage current increases, and the accuracy of detection decreases. Therefore, a designer needs to optimally set the drive frequency in view of a balance between the size of the insulating transformer T1 and the leakage current, such that the potential difference between when water is leaking and when water is not leaking becomes the maximum, and the rate of a voltage effect in the grounded state of a detection band becomes small.

(C) The water leakage detection device 100 can be driven by a low DC voltage of about several V, and thus is safe. Also, since the water leakage sensor 20 and the water leakage detection determining unit 5 are insulated from each other by the insulating transformer T1, even if the water leakage detection device 100 is driven by a high DC voltage, the water leakage detection device 100 is safe. That is, it is possible to widely set the range of the drive voltage for the water leakage detection device 100.

(D) The drive circuit unit 2 is a low-cost analog circuit which is configured by discrete components without using, an expensive integrated circuit or the like. Since the switching circuit 1 is a half bridge circuit which is configured by the two switching elements Q1 and Q2, the switching circuit 1 is further lower cost than a full bridge circuit which is configured by four switching elements. Therefore, it is possible to configure the water leakage detection device 100 at low cost.

(F) In the insulating transformer T1, the primary winding P and the secondary winding S are wound around a magnetic core at positions spaced apart from each other. The insulating transformer T1 has low parasitic capacitances Ct1 and Ct2, and is unlikely to be influenced by a common mode current due to the parasitic capacitances Ct1 and Ct2. Therefore, the water leakage detection device 100 can avoid erroneous detection when any one of the two conductors of the water leakage sensor 20 is connected to the earth.

(Modifications)

While the present invention has been shown and described with reference to certain illustrative embodiments thereof, it will be understood by those skilled in the art that various changes in form and details may be made therein without departing from the spirit and scope of the invention as defined by the appended claims, for example, as will be described in the following (a to (d).

(a) Each switching element Q1 or Q2 of the switching circuit 1 is not limited an FET.

(b) The circuit configuration of the drive circuit unit 2 is not limited to the Above-described illustrative embodiment. For example, the high side switching element Q1 may be driven by a bootstrap circuit or a circuit using a pulse transformer.

(c) The insulating transformer T1 of the above-described illustrative embodiment is the toroidal type transformer T1c or the section winding transformer T1d. However, the present invention is not limited thereto. The insulating transformer T1 needs only to have the primary winding P and the secondary winding S wound around the magnetic core at positions spaced apart from each other, and thus the structure of the insulating transformer T1 is not limited to the exemplified structure.

(d) The current detecting unit 3 of the above-described illustrative embodiment includes the current detection resistive element Rd. However, the present invention is not limited thereto. An arbitrary current detection element such as a current transformer may be used. However, the present invention is not limited thereto.

What is claimed is:

1. A water leakage detection device comprising:
a water leakage detection sensor which is configured to detect water leakage;
a water leakage detection circuit unit which is connected to the water leakage detection sensor, the water leakage detection circuit unit comprising:
an insulating transformer having a primary side and a secondary side, the secondary side being connected to the water leakage detection sensor;
a water leakage detection determining unit which is connected to the primary side of the insulating transformer, the water leakage detection determining unit including a switching circuit, which is a half bridge drive circuit, wherein:
the water leakage detection circuit unit is configured to be driven by a DC voltage from a DC power source and to supply an AC voltage to the water leakage detection sensor through the insulating transformer, and to determine whether water is leaking based on a DC voltage which changes in accordance with a detection signal of the water leakage detection sensor;
wherein the water leakage detection determining unit includes:
the switching circuit which is configured to apply the AC voltage to the water leakage detection sensor through the insulating transformer;
a drive circuit unit which is configured to output a drive signal to the switching circuit; and a current detecting unit which is configured to detect the DC voltage varying based on a detection signal of the water leakage detection sensor; and
the water leakage detection device is configured such that when there is a water leakage, an impedance of the water leakage detection sensor decreases, an AC current flowing in the secondary side of the insulating transformer increases, an AC current flowing in the primary side increases correspondingly, a DC current flowing in the current detecting unit increases, and the DC voltage applied on a resistive element in the current detecting unit increases.

2. The water leakage detection device according to claim 1, wherein the half bridge drive circuit includes two switching elements connected in series.

3. The water leakage detection device according to claim 1,
wherein the insulating transformer includes:
a magnetic core;
a primary winding which is wound around the magnetic core; and
a secondary winding which is wound around the magnetic core at a position spaced apart from the primary winding so as to prevent influence by a common mode current.

4. The water leakage detection device according to claim 1, wherein the water leakage detection sensor includes two conductors which are spaced apart from each other.

5. A water leakage detection device comprising:
a water leakage detection sensor which is configured to detect water leakage; and
a water leakage detection circuit unit which is configured to be driven by a DC voltage from a DC power source, actively supply an AC voltage to the water leakage detection sensor, and determine whether water is leaking based on a detection signal from the water leakage detection sensor,
wherein the water leakage detection circuit unit actively supplies the AC voltage to the water leakage detection sensor through an insulating transformer, and
the water leakage detection circuit unit includes:

the insulating transformer having a primary side and a secondary side, the secondary side being connected to the water leakage detection sensor; and a water leakage detection determining unit which is insulated from the water leakage detection sensor each other by the insulating transformer, the water leakage detection determining unit being connected to the primary side of the insulating transformer, the water leakage detection determining unit including a switching circuit which includes a half bridge circuit configured by two switching elements connected in series, and the switching circuit is configured to actively supply the AC voltage to the primary side of the insulating transformer, an AC voltage being generated in the secondary side to the insulating transformer, and the AC voltage generated in the secondary side being provided to the water leakage detection sensor;

a drive circuit unit which is configured to output a drive signal to the switching circuit; and a current detecting unit which is configured to detect a DC voltage varying based on the detection signal from the water leakage detection sensor, wherein the water leakage detection device is configured such that when there is a water leakage, an impedance of the water leakage detection sensor decreases, an AC current flowing in the secondary side of the insulating transformer increases, an AC current flowing in the primary side increases correspondingly, a DC current flowing in the current detecting unit increases, and the DC voltage applied on the current detecting unit increases.

6. A method of detecting water leakage comprising:

providing a DC voltage to a water leakage detection circuit unit which is configured to determine whether water is leaking based on a detection signal of a water leakage sensor;

generating an AC voltage by a switch circuit which includes a half bridge drive circuit and receives at least one drive signal from a drive circuit unit;

transmitting the AC voltage to an insulating transformer whose primary side connects to the switching circuit and secondary side connects to the water leakage sensor;

generating an AC voltage in the secondary side the insulating transformer;

transmitting the AC voltage in the secondary side the insulating transformer to the water leakage sensor;

checking whether there is a current change in a resistive element in a current detecting unit which is configured to detect a DC voltage varying based on an AC current flowing in the water leakage sensor; and determining that a water leaking exists when a DC current flowing in the resistive element in the current detecting unit increases based on when there is a water leakage, an impedance of the water leakage detection sensor decreases, an AC current flowing in the secondary side of the insulating transformer increases, and an AC current flowing in the primary side increases correspondingly.

* * * * *